United States Patent
Feuerhahn et al.

(10) Patent No.: US 8,311,038 B2
(45) Date of Patent: Nov. 13, 2012

(54) INSTANT INTERNET BROWSER BASED VOIP SYSTEM

(76) Inventors: Martin Feuerhahn, Taipei (TW); Michael Knecht, Werl (DE)

(*) Notice: Subject to any disclaimer, the term of this patent is extended or adjusted under 35 U.S.C. 154(b) by 346 days.

(21) Appl. No.: 12/750,204

(22) Filed: Mar. 30, 2010

(65) Prior Publication Data

US 2010/0254375 A1    Oct. 7, 2010

Related U.S. Application Data

(60) Provisional application No. 61/164,548, filed on Mar. 30, 2009.

(51) Int. Cl.
*H04L 12/66*    (2006.01)

(52) U.S. Cl. ........ 370/352; 370/238; 370/401; 705/400; 705/418; 705/34

(58) Field of Classification Search .................... None
See application file for complete search history.

(56) References Cited

U.S. PATENT DOCUMENTS

| | | | |
|---|---|---|---|
| 7,145,898 B1* | 12/2006 | Elliott | 370/352 |
| 2003/0161448 A1* | 8/2003 | Parolkar et al. | 379/88.17 |
| 2004/0117804 A1* | 6/2004 | Scahill et al. | 719/320 |
| 2005/0041642 A1* | 2/2005 | Robinson | 370/352 |
| 2006/0031516 A1* | 2/2006 | Kumer | 709/227 |
| 2007/0008884 A1* | 1/2007 | Tang | 370/230 |
| 2007/0143182 A1* | 6/2007 | Faber et al. | 705/14 |
| 2009/0240561 A1* | 9/2009 | Altberg et al. | 705/10 |

* cited by examiner

*Primary Examiner* — Asad Nawaz
*Assistant Examiner* — Jason Harley
(74) *Attorney, Agent, or Firm* — Michael Ries

(57) ABSTRACT

The present invention is an instant Internet browser based VoIP system with a VoIP client in the form of temporary VoIP applets that can start in a Web browser and can establish an instant peer-to-peer connection with another web-based or hardware embedded/installed VoIP client using session initiation protocol (SIP) and real-time transport protocol (RTP) audio streaming. The applet is a small file that is easily loaded onto a user's browser and uses application program interfaces (APIs) that require no additional libraries. The applet is written in JAVA, although other programming languages may also be used to write the applet.

18 Claims, 5 Drawing Sheets

INSTANT INTERNET BROWSER BASED VOIP SYSTEM

This application claims priority to U.S. Provisional Application 61/164,548 filed on Mar. 30, 2009, the entire disclosure of which is incorporated by reference.

TECHNICAL FIELD & BACKGROUND

Voice over Internet protocol technology (VoIP) provides a more cost effective way for communication than traditional public switch telephony network technology (PSTN). Current VoIP systems for personal computers (PCs) and other devices require the installation and configuration of proprietary hardware or software or both. The hardware and software are operating system dependent and require operating system knowledge to install. Current systems require the caller and called party to register with the same VoIP service first and then to authorize each other to be contacted online through the VoIP service before they can even place a VoIP call.

Installation, configuration, registration and authorization requirements, combined with the lacking interoperability between the existing VoIP services make a spontaneous, instant VoIP connection between two or more persons all but impossible. This provides a significant barrier for VoIP penetration in the market.

Instant browser-based VoIP is a desirable feature and there have been previous attempts to create various systems and methods of use. Currently there are two different approaches to the instant browser based VoIP used in the market.

One approach is to provide the user with a web user interface where a user can key in two phone numbers. These numbers are then sent via the Internet to the call server and the call server calls these two numbers using a least cost routing technology. This approach is therefore not a browser based VoIP method but is rather web activated calling and comes with several disadvantages. Users must have an Internet connection and access to two phones and two PSTN lines for one call. Each conversation requires two PSTN connections from the call server to the VoIP/PSTN gateways and a VoIP connection between the gateways. That not only adds up the noise, latency and distortion but it simply requires two paid PSTN calls. Free calling that is often associated with VoIP is not possible with this approach.

Another approach is to use various technology, such as Abobe Air and Flex technology, to build temporary VoIP clients. These involve a click-to-call (C2Call) user experience, since it can start in a browser window, provided the very latest flash live video (FLV) player software, such as Adobe Flash Player version 9, is installed and the user can access Active-X controls. These VoIP clients can be created with a development kit, such as an Adobe CS3 Development Kit, and use the audio track of a FLV or flash video format and transmission control protocol (TCP) streaming that works only with a proprietary and not an open source codec, such as the Nellymoser Asao codec, so there is no choice of a license-free codec. A second problem is that any voice communication must be streamed through a flash media server, where it is then not possible to establish a peer-to-peer connection. All voice traffic must go through the flash media player server, which demands huge Internet bandwidth and a server farm for a larger deployment. Not having peer-to-peer capabilities further reduces the voice quality and does not provide the best possible Internet connection between the two peers, since both parties must connect to the media server for the call. This forced routing through defined servers also adds latency and reduces connection quality.

Software solutions, such as Adobe solutions, also work only on supported systems and with the latest flash player software, such as Adobe Flash Player version 9, installed. Adobe Flash also requires different drivers, plug-ins and software for the various operating systems. At this time, recent programming languages, such as JAVA, is part of more users' Internet experiences, since almost all recent websites use JAVA and JAVA script and are included not only with the latest PC and browser generations but with several previous generations of PCs as well.

The present invention generally relates to an instant Internet browser based VoIP system. More specifically, the invention is a system and method that can establish spontaneous, instant and entirely browser-based peer-to-peer VoIP on all operating systems, Web browsers and devices in the form of a temporary VoIP client.

It is also an object of the invention to provide a C2Call functionality and user experience, allowing the user to experience VoIP as an entirely web-based application.

What is really needed is a system and method that aims to remove the current existing barriers that prevent convenient VoIP usage and to enable all Internet users to use VoIP as a communications method without the requirements of the users to install and configure software before using VoIP.

SUMMARY OF THE INVENTION

The present invention is directed to an instant Internet browser based VoIP system with a VoIP client in the form of temporary VoIP applets that can start in a Web browser and can establish an instant peer-to-peer connection with another web-based or hardware embedded/installed VoIP client using session initiation protocol (SIP) and real-time transport protocol (RTP) audio streaming. The applet is a small file that is easily loaded onto a user's browser and uses application program interfaces (APIs) that require no additional libraries. The applet is written in JAVA, although other programming languages may also be used to write the applet.

Another aspect of the invention is the integration of several speech codecs in the VoIP applet audio core such as GSM 610, Speex, G 723.1 and iLBC directly addressing the operating system's audio engine.

Another aspect of the invention is the implementation of a RTP streaming protocol in the temporary VoIP applet using circular buffers in the user datagram protocol (UDP) environment and the implementation of a firewall strategy that works in any operating system and standard cable modem and Internet router environment with firewalls and network address translation (NAT) support.

Another aspect of the invention is that the VoIP applet auto senses the hardware and software environment of the device it's deployed on and automatically configures the device's audio settings to support the VoIP connection, thus eliminating the need for the user to manually configure the device he is using.

Another aspect of the invention is an Ajax based widget that supports all popular browsers and has full access to the VoIP applet functions.

Another aspect of the invention is the integration of the VoIP applet in a SIP server environment.

Another aspect of the invention is that the user can log-in to free VoIP websites, such as FriendCaller, to start the VoIP applet and get instant access to the user interface in the form of a web-phone. Once the user has started the applet, he is able to see the online status of his contacts. He then can instantly call any of the contacts that are online.

Another aspect of the invention is that standard HTTP URLs can be used to notify a communication request from one user to another user. A user can start the VoIP applet by clicking on a link in the form of a HTTP URL or a graphical element like a web banner attached with a HTTP URL. Links and banners can then be e-mailed, posted in an instant message (IM), sent via a short message service (SMS) text or integrated into various websites.

Another aspect of the invention is to add contacts to the user's contact list by sending "invitation" e-mails with embedded links to a recipient from a free VoIP website. The recipients can then start the VoIP applet by opening the link in their browser. Through the opening of the link, the recipient declares his acceptance to be added to the sender contact list. The recipient of a link does not have to register with the free VoIP website and does not have to install any software before using the VoIP applet. The link provides the system with the required information to display the name of the sender and recipient in each web-phone user interface, thus providing caller-ID functionality.

Another aspect of the invention is that a user can register with a free VoIP website and generate personalized links that can be emailed, placed on websites, blogs or a social networking site. Any recipient of the link or visitor of a website can start the VoIP applet by opening the link and calling the sender or owner anonymously. A useful feature of the invention is that a call generated through any such link can be terminated into the PSTN network.

Another aspect of the invention is that it can easily be integrated in any website that requires a login and has a contact list. It allows such websites to offer its users the instant voice feature through a single log-in to the website without additional registration on a free VoIP website or to install any needed software. Examples of such websites are social networking sites that very recently have started to integrate browser based text-chat and instant messaging (IM).

Another aspect of the invention is that the method can be transferred to other platforms like those in smart cell phones, such as an iPhone, that do not supporting the JAVA programming of the VoIP applet. Such an embodiment is demonstrated but not limited to the FriendCaller free VoIP for the iPhone and the iPod touch pad application that can be installed on the iPhone and iPod touch pad.

Another aspect of the invention is that the VoIP applet can operate in several browser windows on the same device.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
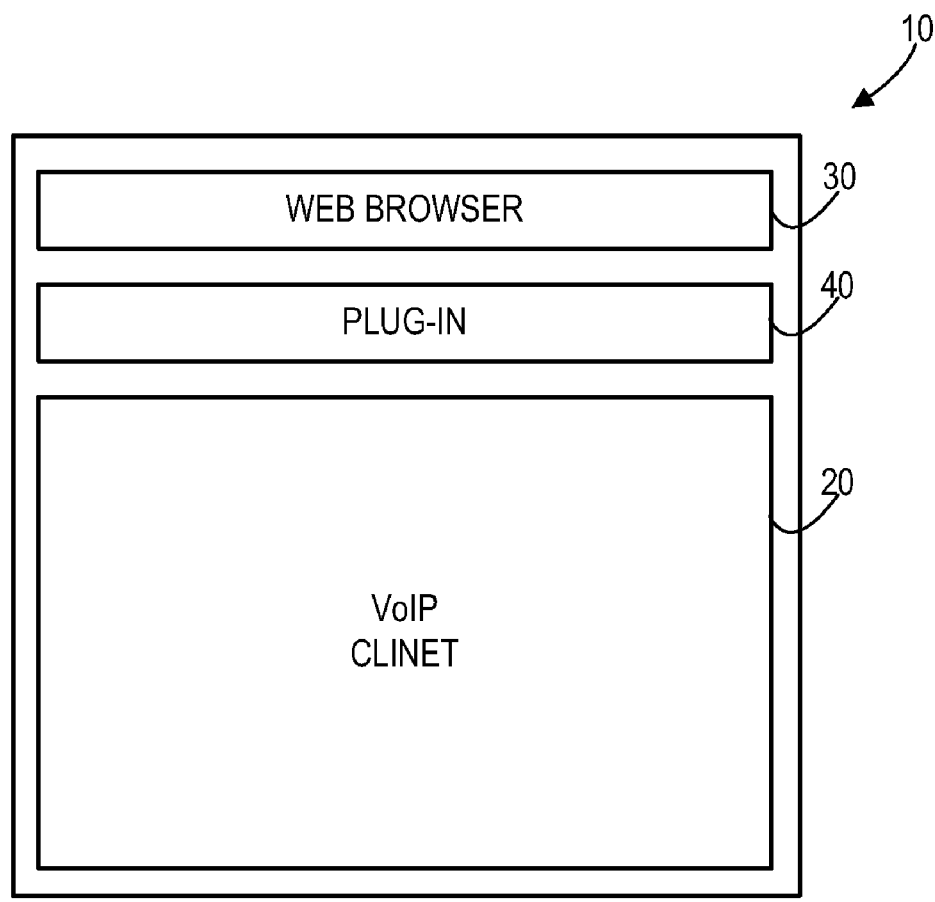
FIG. 1 illustrates a block diagram of an instant Internet browser based VoIP system with a VoIP client embedded in a Web browser environment, in accordance with one embodiment of the present invention.

FIG. 1 illustrates a block diagram of an instant Internet browser based VoIP system 10 with a VoIP client 20 in a Web browser environment, in accordance with one embodiment of the present invention. The Web browser 30 can be any Web browser known to those schooled in the art that can support the VoIP client 20. The VoIP client 20 can also be written in any programming language that can perform the functions of the VoIP client 20, although JAVA is the programming language that best performs the functions of the VoIP client 20. The plug-in 40 used with the instant Internet browser based VoIP system 10 is a JAVA Virtual Machine or JAVA VM plug-in, although other plug-ins that are well known in the art can also be used that can support the functions of instant Internet browser based VoIP system 10.

Figure 2:
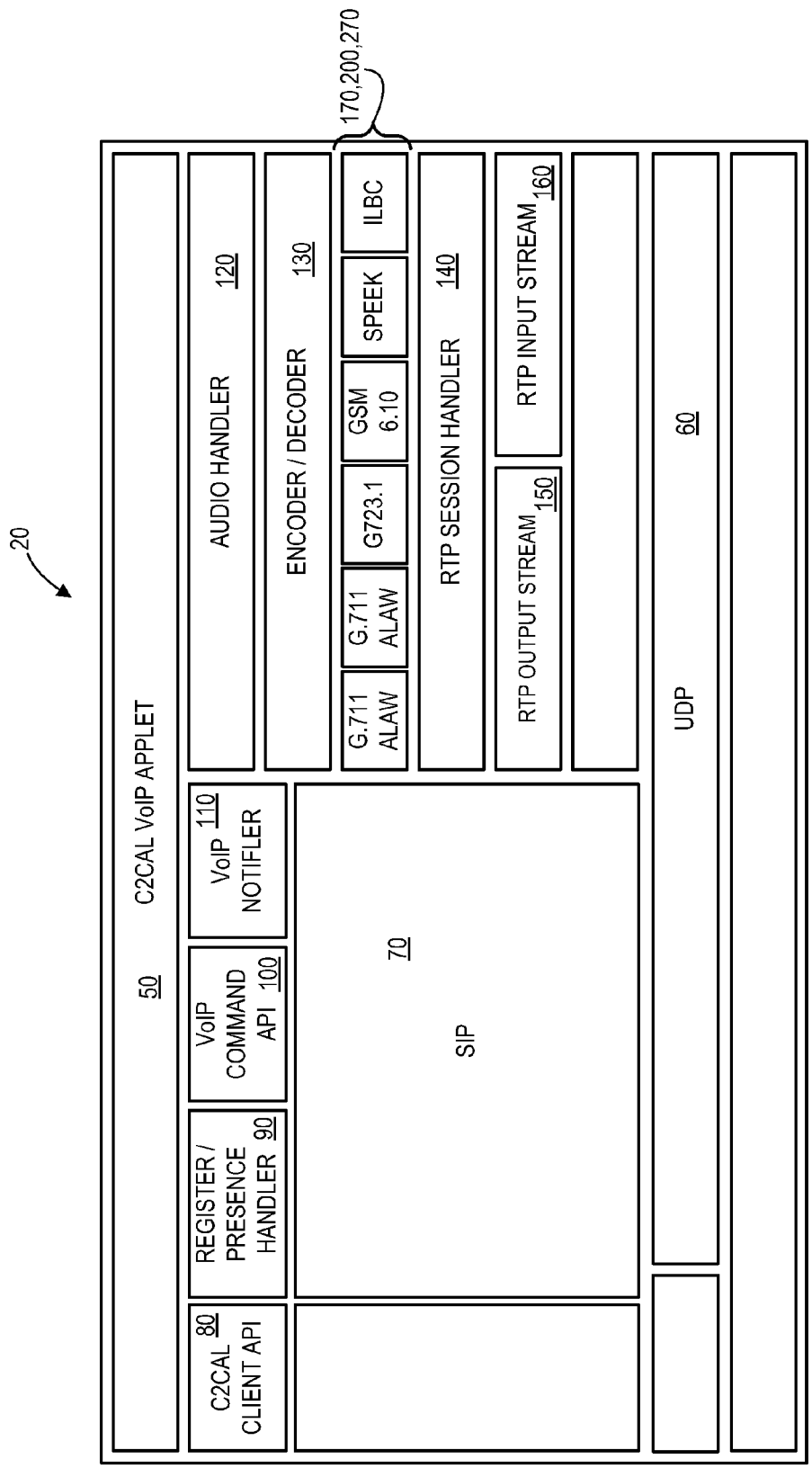
FIG. 2 illustrates a block diagram of a VoIP client and its components, in accordance with one embodiment of the present invention.

FIG. 2 illustrates a block diagram of a VoIP client 20 of the instant Internet browser based VoIP system 10 and its components, in accordance with one embodiment of the present invention. The main component of the VoIP client 20 is a C2Call applet 50, which is written in JAVA script or any other programming script language that is well known in the art that can perform the functions of the VoIP client 20. The VoIP client 20 uses only low level APIs to implement the VoIP service and therefore, all required components have to be implemented as part of the VoIP client 20. The required environment on the Internet device is a JAVA enabled Web browser 30 based on a JAVA runtime environment of 1.5 or later version with audio hardware that includes a speaker and a microphone (not shown), although other environments that are well known in the art can also be used that can perform the functions of the VoIP client 20. The VoIP client 20 has to fulfill several criteria. First the C2Call applet 50 must be as small as possible to reduce the required loading time and a codec with excellent voice quality directly addressing the operating system's audio engine (not shown) should also be implemented. A rich text format (RTF) streaming protocol must also be defined that can work in the user datagram protocol (UDP) environment 60 where voice data packets may arrive out of order, be duplicated or go missing without notice. Auto sensing is also required to detect the system's audio settings and correct them to allow a convincing user experience even for an inexperienced user. Creating an asynchronous JAVA script XML (Ajax) based widget (not shown) that supports all popular browsers and the implementation of the VoIP applet 50 in a carrier class SIP server environment 70 is also an important criteria.

The VoIP client 20 provides the following functionality and components to implement the VoIP service. The C2Call client API 80 handles contact lists, call history and client authentication involved with the VoIP client 20. The register/presence handler 90 and the VoIP client 20 connect to the SIP proxy (FIG. 3, 190) based on a regular register request, submits its presence information and retrieves presence information from any related contacts. The VoIP command API 100, is an API that provides an easy to use interface to initiate, take and terminate calls. The VoIP command API 100 can be accessed via JAVAscript from the HTML page. The VoIP notifier 110 is a notifier service that informs the Web browser/HTML page 30 on call and during presence events. It notifies incoming calls, online status information and any change of presence status of related contacts. The audio handler 120 detects audio hardware, provides audio setting dialogs and manages the initialization of the audio hardware for the call. The audio handler 120 also sends audio data to the network and retrieves audio data from the network. The audio handler 120 uses JAVA sound to implement the audio playback and recording functions. The encoder and decoder 130 manage the audio encoding and decoding process by using different built-in codecs (not shown). Implementation of a codec (not shown) with excellent voice quality directly addressing the operating system's JAVA audio engine is also required. The SIP protocol stack and the implementation of the SIP 70 are based on a Jain SIP implementation, although other SIP implementations that are well known in the art that can carry out the functions of the VoIP client 20 can also be used. The RTP session handler 140 implements the RTP audio output stream 150, the RTP audio input stream 160 and also implements any firewall strategies. The firewall strategies must be put in place that works on any operating system and in standard cable modem and Internet router environments with firewalls and network address translation (NAT). An additional plurality of codecs 170, which include the GSM 610, Speex, G 723.1, iLBC, G 7.11 uLaw and aLaw codecs are also incorporated into the VoIP client 20.

Figure 3:
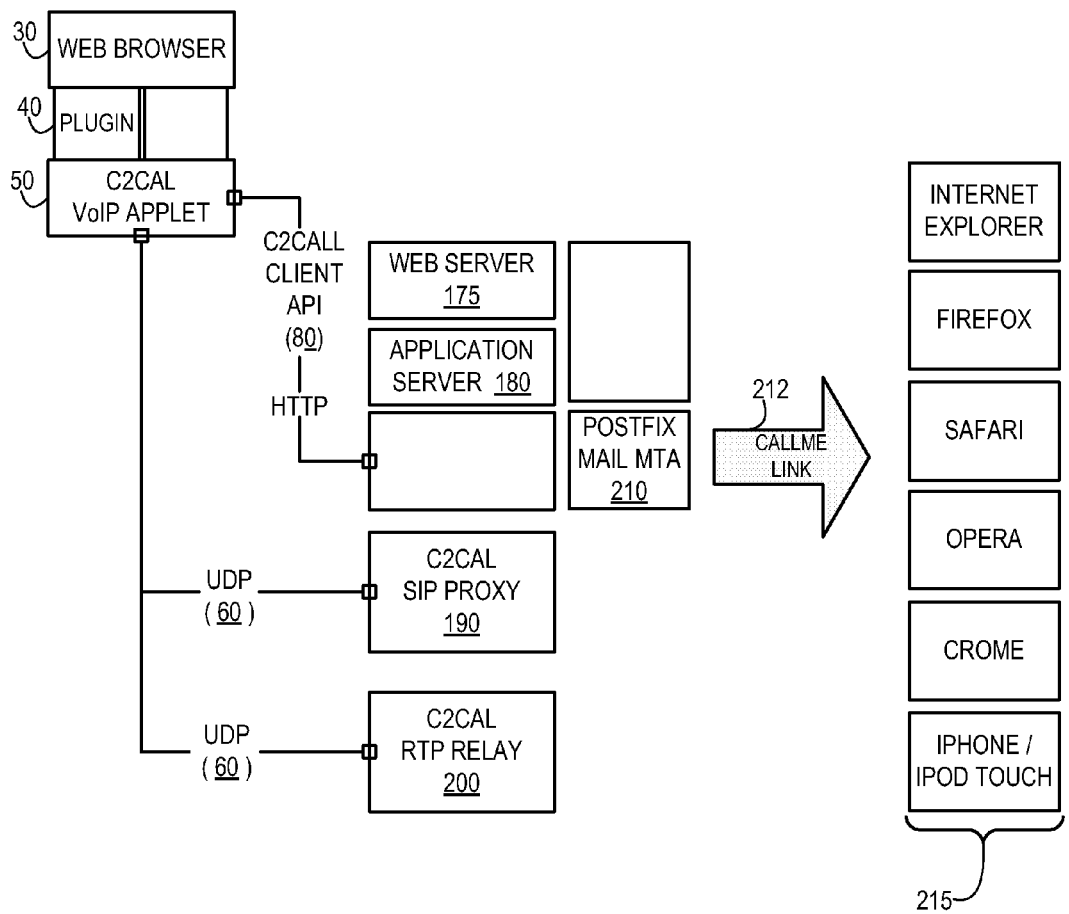
FIG. 3 illustrates a flow chart of a client-server architecture of a Web-based VoIP service, in accordance with one embodiment of the present invention.

FIG. 3 illustrates a diagram of a client-server architecture of a Web-based VoIP service, in accordance with one embodiment of the present invention. The VoIP applet 50 plugged into the Web browser 30 is connected to the VoIP service components on the server side. The main Web server 175 components are mainly divided into the application server 180, which manages contacts and relationships between users of the services, provides all Web forms and the call link management. The SIP proxy 190 implements a session initiation protocol proxy and handles presence information. The RTP relay 200 has a media server and serves as a gateway into any PSTN networks and is used when peer-to-peer communication cannot be achieved. The postfix mail transfer agent (MTA) 210 handles the email transfer for call links, invite emails and registration "call me link" 212 confirmations to a plurality of Web browsers, such as Internet Explorer, Firefox, Safari, Opera and Crome and can include an iPhone and an iPod Touch Pad 215. The VoIP client 20 is embedded in a Web browser 30 to implement a peer-to-peer VoIP, based on a SIP protocol 70 and RTP audio streaming. The VoIP applet 50 is a temporary JAVA applet that can be plugged into a website as a soft phone to make phone calls based on the SIP protocol 70. The VoIP applet 50 has a very small footprint and is a small file that uses only JAVA APIs that are included in standard JAVA Virtual Machine 1.5. No additional libraries like a JAVA media framework (JMF) or any other framework known to those schooled in the art are required for the VoIP applet 50 to work.

The VoIP applet 50 implements the SIP protocol based on a Jain SIP API V1.2, although other SIP APIs that are capable of performing the functions of the VoIP client 20 that are well known in the art can also be used. The JAVA VoIP applet 50 achieves excellent audio quality, reliable call set-up behind firewalls and is small in applet size through running multiple VoIP JAVA applet instances in multiple browser windows. The VoIP applet 50 also records and plays back high quality voice in JAVA sound, implements advanced firewall strategies, integrates low bandwidth speech codecs and utilizes a method of RTP streaming using circular buffers, further described in the FIG. 5 description. While running multiple VoIP applet instances in multiple browser windows is an important aspect of running a VoIP client 20, a user can also open the same website in multiple browser windows. Therefore, unlike installed native VoIP clients, the browser based VoIP client 20 can be started multiple times. This additional complexity must be handled correctly in order to avoid conflicts in call signaling or audio handling and to avoid multiple registrations from the same host. Starting a JAVA applet in a Web browser will launch a separate JAVA Virtual Machine specifically for that JAVA applet. In case the same JAVA applet will be launched in multiple browser windows from the same site (URL), a new instance of the JAVA applet will be launched in the same JAVA Virtual Machine instance. This specific behavior has been used to ensure, that only one VoIP JAVA applet 50 is active at the same time if multiple instances have been launched. The actual VoIP core (not shown) will be launched only once per JAVA Virtual Machine instance. The VoIP core is encapsulated in a VoIP core object (not shown), which is available as a static variable within the JAVA Virtual Machine. When a new VoIP applet 50 will be launched from a website, during the applet initialization it will be checked whether a VoIP core is already available inside the JAVA VM. If so, the VoIP Applet 50 will use the VoIP core object, set itself a current active applet and increase a reference counter. In case no VoIP core is available, a new VoIP core will be initialized and stored as a static reference in the JAVA VM.

The activity status between the multiple applet browser windows is handled according to standard JAVA applet behavior. If a browser window gets the focus, the applet "start" function will be called and the formerly active JAVA applet will receive a "stop" function. In case of a stop, the VoIP applet 50 removes it's activity status from the VoIP core, while in case of a "start", the VoIP applet 50 will set its activity status within the VoIP core. Only the last active VoIP applet 50 will receive any notifications like an incoming call, from the VoIP core. Therefore, only the active VoIP applet 50 will take over the managing role. This method ensures, that in case of multiple open pages of the VoIP website, only the last active page has control over the VoIP connection. The JAVA VoIP applet 50 records and plays back voice in JAVA sound with high audio quality with any VoIP applications transmitting voice data over the Internet, which have been recorded by a microphone. The voice data will be separated into packets and streamed to the destination via RTP. Before the voice can be streamed to the destination, the voice data needs to be encoded into 8000 Hz voice data, using an uncompressing or compressing speech codec. JAVA sound allows to directly retrieve the audio data in the required sample rate from the capture device. However, the audio quality is poor, therefore, for implementation of high quality audio streaming, the audio data will be retrieved in a sample rate of 44100 Hz and will be transcoded into 8000 Hz, by a sample rate converter, before streaming the audio data to the remote client.

Figure 4:
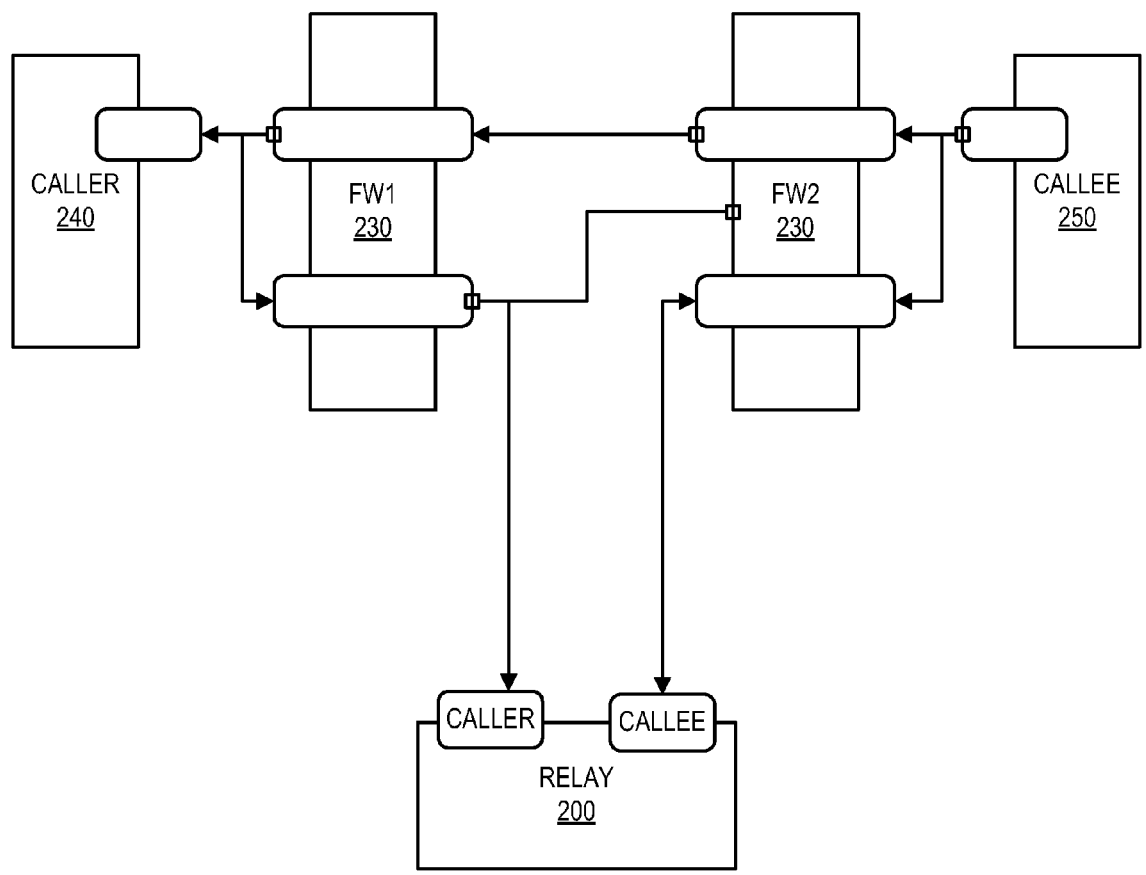
FIG. 4 illustrates a flow chart for a caller to callee VoIP call firewall strategy, in accordance with one embodiment of the present invention.

FIG. 4 illustrates a diagram of a caller 240 to callee 250 VoIP call firewall strategy, in accordance with one embodiment of the present invention. In a firewall strategy for a VoIP application, the call initialization is a critical part, as the calling parties' systems are usually operating behind firewalls and routers 230 using NAT. That makes it challenging to establish an audio connection between the caller 240 and the callee 250, since they cannot be directly addressed because their public "official" IP address and their local network IP address behind the firewall/routers 230 are not identical. Ensuring VoIP connectivity often proves challenging because of the number and variety of NAT firewalls 230 that might exist between the users. A number of solutions have been proposed to allow SIP based VoIP calls to cross firewalls 230, but each class of NAT firewall 230 requires a different technique. To further complicate matters, the various NAT traversal solutions proposed address only one class of NAT device, such as the simple traversal of UDP through NAT (STUN) technique, which will not work with symmetric NATs. The most reliable way to connect both users would be to use a controlled relay 200 that could be used to route all voice data traffic through a given call pathway. Unfortunately this solution would create a bandwidth bottleneck by directing all data traffic through the server's relay, which would create a direct conflict with the target to establish a peer-to-peer connection.

This firewall strategy solves this conflict by using the controlled relay 200 only during a short call set-up period to establish a reliable peer-to-peer connection. The IP addresses and NAT characteristic of the relay router 200 are known and can be used to apply the firewall strategy 300 to determine what type of NAT firewalls 230 exist between VoIP clients 20 and to determine a set of IP addresses by which VoIP clients 20 can establish contact. Using a number of protocols and network connectivity mechanisms, the network topology in which the VoIP clients 20 operate and the various sets of network addresses by which these devices can communicate is determined. Once both VoIP clients 20 confirm a possible peer-to-peer connection, they will drop the relay connection and continue to communicate peer-to-peer. All this happens unnoticed by the callers, since there are no delays or dropouts. The integration of G 7.11 uLaw and aLaw speech codecs 260 in addition to the JAVA sound system requires a bandwidth of 64 kBit/s in each direction. This bandwidth requirement is too high for low bandwidth conditions typical for Internet connections available to consumers and therefore the JAVA VoIP applet 50 needs to integrate additional compressing codecs to support voice communication in low bandwidth environments. Therefore additional GSM 610, Speex, G 723.1 and iLBC codecs 270 have been ported to JAVA and have been integrated into the VoIP core to perform the compression.

Figure 5:
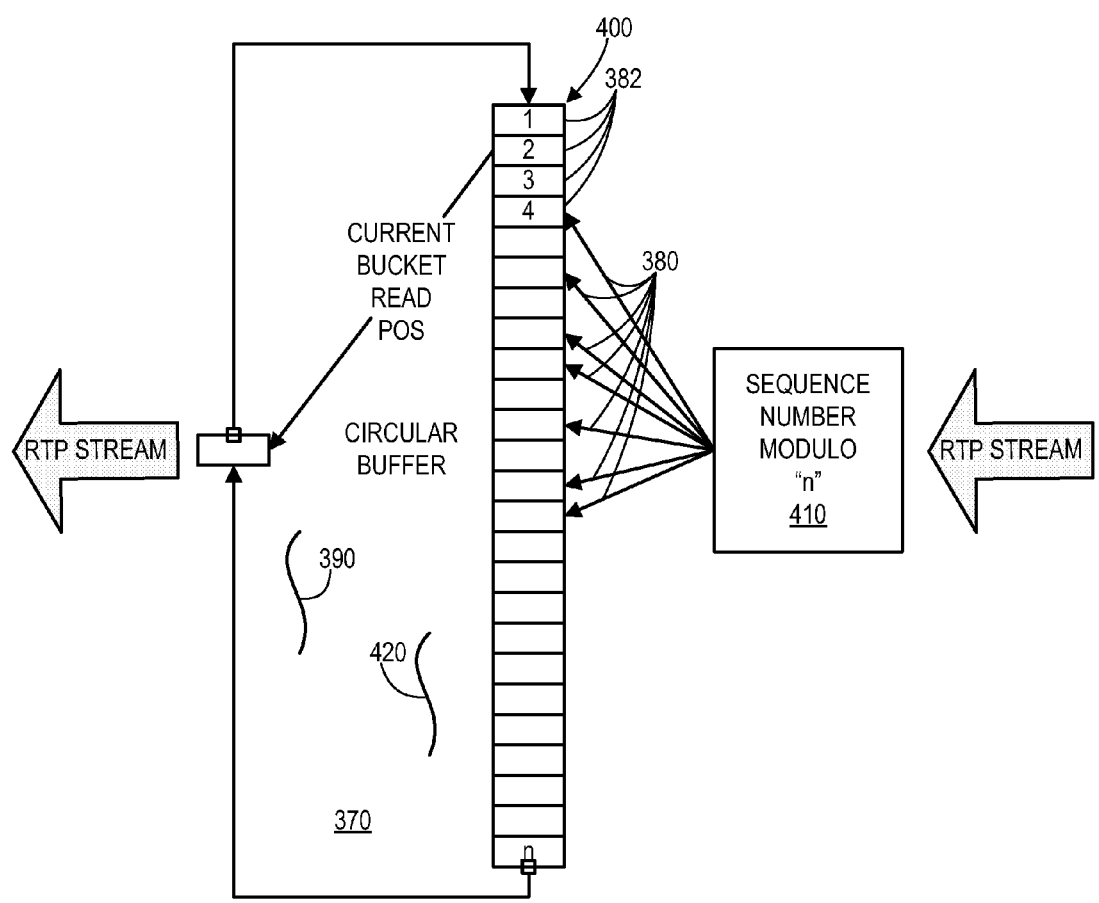
FIG. 5 illustrates a flow chart for RTP streaming using circular buffers, in accordance with one embodiment of the present invention.

FIG. 5 illustrates a diagram of RTP streaming using circular buffers, in accordance with one embodiment of the present invention. Sending and receiving voice packets in a 20 ms interval will create a significant load in a VoIP applet 50. A VoIP applet 50 is a relatively small component embedded within a website, which shouldn't take the majority of CPU resources. Therefore a VoIP applet 50 will run at low priority when embedded in a website. One of the time consuming tasks of the VoIP applet 50 is buffering the incoming data packets and reordering and forwarding the data to the audio hardware (not shown). In order to manage this task usage with a minimal amount of CPU resources, a specific circular buffer 370 has been developed. The design of the circular buffer 370 minimizes the numbers of memory copy operations, reduces or eliminates efforts for reordering packets and reduces or eliminates the need for synchronization and locks. The RTP streaming using the specific circular buffers 370 has several advantages. Incoming RTP packets 380 from the network will be placed in the buffer 370, while the playback audio entity (not shown) is reading the audio packets 382 from the buffer 370 at the same time. Usually if two independent threads are accessing a given buffer, synchronization and a locking mechanism are required in order to avoid conflicts.

The circular buffer 370 is organized in 0–(n–1) buckets, where n=number of buckets 400. Each bucket 400 holds 1 RTP audio packet 382, with each incoming RTP packet 380 being assigned to a bucket 400 based on its sequence number 410, according to the following formula:

bucket_number=sequence_number modulo number_of_buckets 410

Therefore, even in the case that incoming RTP packets 380 are out of order, the incoming packets 380 will be assigned to their bucket 400 according to the formula above and will be automatically ordered at no costs. In case a bucket 400 is not empty, the incoming packet 380 will be dropped. The playback or reading thread 390 will read the incoming RTP packets 380, bucket 400 by bucket 400, starting with the bucket 400 of the first packet 380 received. If an incoming packet 380 has an older time stamp then the latest read audio packet 382, then the incoming packet 380 will be dropped. The network thread 420 will write audio packets 382 into the buckets 400 and will add the packet size to the total buffer size. The playback thread 390 will read audio packets 382 bucket 400 by bucket 400, by incrementing a read index (not shown) based on the following formula:

read_index=read_index+1 read_index=read_index modulo number_of_buckets

If a bucket 400 is empty (missed packet), the read index will be incremented and the next bucket 400 will be read. When an audio packet 382 has been read, the total buffer size will be reduced by the packet size and the bucket 400 will be set to null. If the total buffer size is 0, the playback thread 390 will wait until data is available. Based on this, no synchronization is required as simple integer operations don't need to be synchronized. Due to the mapping of bucket numbers (not shown) to RTP sequence numbers 410, the packet 380 will be automatically arranged in the correct order. If packets 380 are coming in late, they'll be simply dropped. Since only references to RTP packets 380 are handed over from the network interface to the audio handler, the amount of memory copy gets minimized.

Using call-links or standard HTTP URLs (not shown), sent from a caller 240 to a callee 250, in order to notify a communication request to allow for implementing the VoIP client 20 in a web page, bring a new user experience to the interactive voice communication. This means a Voice over IP user can be addressed by a simple URL. Opening that URL, launches the webpage to allow instant voice calls without installation or set-up from any PC or JAVA enabled Internet device. In order to establish a communication to a user who is new to the VoIP service, a call link will be sent via email to the targeted user. This user receives the email with an embedded unique call link. When the user clicks on the link, the VoIP page opens and establishes the call to the originator of the email.

A user can also add contacts to their contact list by sending "invitation" e-mails with embedded links to a recipient from a free VoIP website. The recipients can then start the VoIP applet 50 by opening the link in their browser. Through the opening of the link, the recipient declares his acceptance to be added to the sender contact list. The recipient of a link does not have to register with the free VoIP website and does not have to install any software before using the VoIP applet 50. The link provides the system with the required information to display the name of the sender and recipient in each webphone user interface, thus providing Caller-ID functionality.

A user can also register with a free VoIP website and generate personalized links that can be emailed, placed on websites, blogs or a social networking site. Any recipient of the link or visitor of a website can start the VoIP applet 50 by opening the link and calling the sender or owner anonymously. A useful feature of the VoIP client 20 is that a call generated through any such link can be terminated into the PSTN network.

The instant Internet browser based VoIP system 10 can also easily be integrated in any website that requires a login and has a contact list. It allows such websites to offer its users the instant voice feature through a single log-in to the website without additional registration on a free VoIP website or to install software. Examples of such websites are social networking sites that very recently have started to integrate browser based text-chat and instant messaging (IM).

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. An instant Internet browser based voice over Internet protocol (VoIP) system, comprising:
    an Internet based browser and a plug-in;
    a VoIP client, said plug-in embedding said client into said browser;
    a click-to-call (C2Call) VoIP applet that performs the functions of said client;
    a C2Call client application program interface (API) that manages contact lists, call history and client authentication for said applet;
    a register and presence handler for submitting and retrieving register information and presence information from any contacts for said applet;
    a VoIP command API to initiate, receive and terminate VoIP calls for said applet;
    a VoIP notifier that notifies said browser of incoming said VoIP calls, online status information and any change of presence status of said contacts for said applet;
    an audio handler that sends and retrieves audio data from said browser and implements audio playback and recording functions for said applet;
    an encoder and decoder that manages audio encoding and audio decoding performed by a plurality of audio codecs for said applet;
    a rich text format (RTP) session handler for implementing RTP audio output streams, RTP audio input streams and firewall strategies of said VoIP client for said applet;
    a main web server with an application server for managing said contacts and relationships between callers and callees of said VoIP calls that also provides all Web forms and call link management and a postfix mail transfer agent (MTA) to handle email transfers for call links, invite emails and confirmations to a plurality of outside Web browsers;
    a C2Call session initiation protocol (SIP) proxy that handles said presence information in combination with said register and presence handler;
    a C2Call relay that serves as a gateway into any PSTN networks that is used when a peer to peer communication cannot be achieved by said VoIP applet; and
    a circular buffer with a plurality of buckets, a playback thread and a network thread to efficiently manage and buffer said RTP streams with a plurality of incoming data packets and a plurality of audio packets, that works in combination with said RTP session handler.

2. The system according to claim 1, wherein said VoIP client is embedded in said browser to implement a peer to peer VoIP call based on a SIP environment and said RTP audio streams.

3. The system according to claim 1, wherein said VoIP client creates an Ajax based widget to support said plurality of outside browsers and said implementation of said applet in said SIP environment.

4. The system according to claim 1, wherein said applet can be plugged into an outside website as a soft phone to make said VoIP calls based on said SIP environment.

5. The system according to claim 1, wherein said applet runs multiple VoIP instances in multiple browser windows.

6. The system according to claim 5, wherein said VoIP client can be started multiple times.

7. The system according to claim 1, wherein said audio handler detects audio hardware, provides audio setting dialogs and manages initialization of said audio hardware for said VoIP call.

8. The system according to claim 1, wherein said firewall strategies include using said C2Call relay during a short call set-up period to establish a reliable said peer to peer connection.

9. The system according to claim 8, wherein said relay connection is dropped once said peer to peer connection is confirmed and said peer to peer VoIP call is continued.

10. The system according to claim 9, wherein additional compression codecs are used to compress said VoIP call bandwidth after said VoIP call is continued.

11. The system according to claim 10, wherein said additional compression codecs are GSM 610, Speex, G 723.1 and iLBC codecs.

12. The system according to claim 1, wherein said buffer is designed to minimize memory copy operations, reduce and eliminate efforts for reordering said packets and reduce and eliminate a need for synchronization and locks.

13. The system according to claim 1, wherein said incoming packets are placed in said buffer while said audio packets are read concurrently.

14. The system according to claim 1, wherein one said bucket holds one said audio packet, while each said incoming packet is assigned to one said bucket.

15. The system according to claim 1, wherein said playback thread will read said incoming packets said bucket by said bucket by incrementing a read index to arrange said incoming packets into said buckets in a correct sequential order.

16. The system according to claim 15, wherein said network thread will write said audio packets into said buckets in said correct sequential order.

17. The system according to claim 1, wherein call links and standard HTTP URLs are sent to implement said VoIP client into an outside webpage to allow instant voice calls without any installation and set-up to an outside PC and Internet device.

18. The system according to claim 1, wherein said VoIP client is integrated onto a free VoIP website and generates a contact list and personal links on any website.

* * * * *